United States Patent [19]

Hannah

[11] Patent Number: 4,803,798
[45] Date of Patent: Feb. 14, 1989

[54] FISHING AID

[76] Inventor: Dan L. Hannah, R.R. 1, Box 144A, Elnora, Ind. 47529

[21] Appl. No.: 86,070

[22] Filed: Aug. 17, 1987

[51] Int. Cl.$^4$ .............................................. A01K 83/00
[52] U.S. Cl. .................. 43/43.13; 43/44.91; 43/42.36
[58] Field of Search ................ 43/42.36, 44.9, 44.91, 43/42.13, 43.13, 44.93

[56] References Cited

U.S. PATENT DOCUMENTS

| | | |
|---|---|---|
| 1,103,707 | 7/1914 | Threm . |
| 1,991,253 | 2/1935 | Kerns . |
| 2,036,954 | 5/1936 | Murray .................. 43/43.13 |
| 2,577,549 | 12/1951 | Vice . |
| 2,772,902 | 12/1956 | Lind .................. 43/43.13 |
| 2,775,840 | 1/1957 | Dumas .................. 43/43.13 |
| 2,952,937 | 9/1960 | Wassing . |
| 3,130,516 | 5/1964 | Ballard .................. 43/43.13 |
| 3,161,982 | 12/1964 | Lee .................. 43/44.93 |
| 3,947,990 | 4/1976 | Johnson . |
| 4,016,671 | 4/1977 | Larsen .................. 43/43.13 |

FOREIGN PATENT DOCUMENTS 690084 5/1953 United Kingdom ............... 43/44.91

Primary Examiner—Nicholas P. Godici
Assistant Examiner—Karen Skillman
Attorney, Agent, or Firm—Barnes & Thornburg

[57] ABSTRACT

A fishing sinker is provided for aligning a fishhook so that the main barb of the hook is directed toward the upper or lower portion of a fish's mouth, thereby decreasing the likelihood that the hook will be pulled sideways through the opening in the fish's mouth created by the sinker. The sinker includes a generally conical body having an elliptical cross section with front and back portions that are wider than its side portions, and a locking portion to secure the fishhook in a predetermined orientation with respect to the body. When the fish bites the sinker, the body rotates so that the front and back portions of the elliptical cross section of the body are generally parallel to the upper and lower portions of the fish's mouth. By securing the fishhook so that the main barb extends substantially perpendicularly away from the front and back portions, the main barb will be directed toward the upper or lower portions of the fish's mouth.

21 Claims, 1 Drawing Sheet

FISHING AID

BACKGROUND AND SUMMARY OF THE INVENTION

This invention relates to the art of fishing, and particularly to a fishing sinker which aids in aligning a fishhook so that the main barb of the hook extends either upward or downward in the mouth of the fish as the fish bites.

It is well known in the art of fishing to attach weighs or sinkers to a fishing line to cause the hook to sink to a specific depth. Both round weights and teardrop shaped sinkers are known. Round weights have a disadvantage when they are attached near the hook. Because round weights only engage the fishing line, the fishhook is free to rotate with respect to the weight. The orientation of the hook with respect to the fish's mouth is therefore random. If a fish strikes the hook and overbites to include the weight, the weight provides a gap through which the hook can be pulled sideways, thereby exiting the mouth of the fish without engaging the hook barb. This "miss area" created by the round weight increases with the size of the weight attached to the line.

An object of the present invention is to eliminate this "miss area" by providing a means to orient the hook inside the fish's mouth so that the hook cannot escape sideways through the opening in the fish's mouth created by the sinker.

In accordance with the present invention, a fishing sinker includes locking means for securing the fishhook in a predetermined orientation with respect to the sinker. The sinker further includes alignment means for rotating the sinker relative to the fish's mouth to direct the main barb of the fishhook toward either the upper or lower portion of the fish's mouth when the fish bites the sinker.

The present invention comprises a sinker which surrounds the fishing line and includes a slot in the base for inserting the eye of a fishhook to secure the fishhook in a predetermined orientation with respect to the sinker.

The body of the sinker of the present invention is generally conical in shape, but the body is configured to have an elliptical cross section across the longitudinal axis to provide front and back portions that are wider than its side portions. When a fish strikes the sinker, the force of the bite will cause the sinker to rotate so that the front and back portions rest between the upper and lower portions of the fish's mouth. By positioning the barb of the hook substantially perpendicular to the front and back portions of the sinker, the main bar will be oriented toward either the upper or lower portion of the fish's mouth and therefore will engage with the mouth of the fish.

One feature of the present invention is to provide two generally perpendicular recesses formed in the base portion of the sinker to receive the eye of a fishhook for non-rotatably aligning the fishhook with respect to the sinker.

Another feature of the present invention is to provide a generally conical body having an elliptical cross section surrounding the two recesses to rotate the barb of the fishhook toward the upper or lower portion of the fish's mouth when the fish strikes the hook and sinker, thereby increasing the likelihood of engaging the hook barb.

Additional objects, features, and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
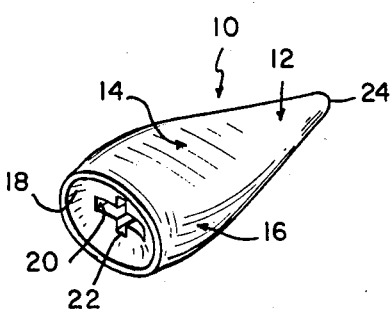
FIG. 1 is a perspective view from the backside of the sinker.

The fishing sinker 10 shown in FIG. 1 comprises a generally conical body 12 having a concave base portion 18 and a tapered nose portion 24. The base portion includes a first slot 20 and a second slot 22. The sinker body 12 has an elliptical cross section that includes front and back portions 14 that are wider than its side portions 16. The cross section of the body has increasing eccentricity from the nose portion to the base portion.

The tapered nose portion 24 and the overall streamlined body aid in moving the sinker through the water and help prevent the sinker from catching on debris in the water.

Figure 5:
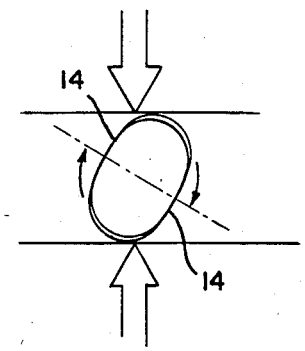
FIG. 5 is a diagrammatical view used to explain the rotation of the sinker within the fish's mouth as the fish bites.

Because of the shape of the sinker body 12, the body rotates to a predetermined orientation when a fish bites the sinker. As illustrated in FIG. 5, when the fish's mouth applies an external force in the direction of the large arrows, the sinker body 12 will rotate according to the small arrows until the front and back portions 14 are essentially parallel to the upper and lower portions of the fish's mouth. This position provides the most stability.

Figure 2:
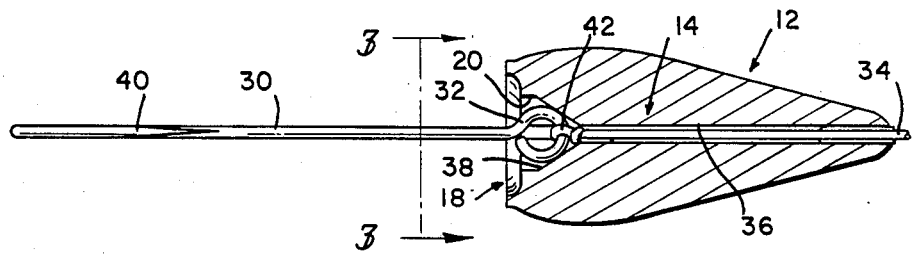
FIG. 2 is a sectional view through the sinker with the hook and line in place.
Figure 4:
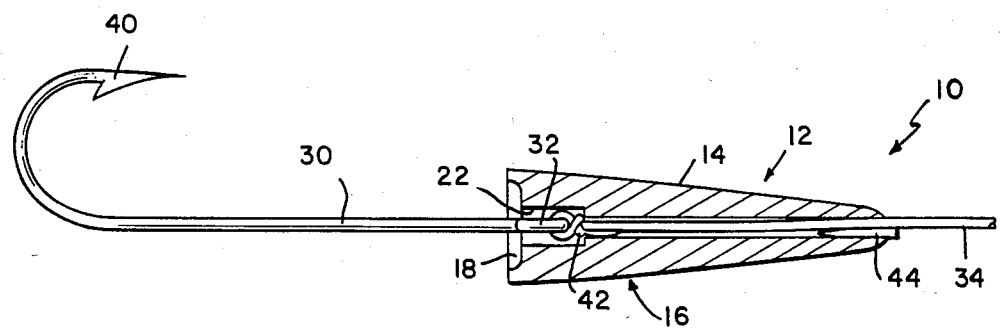
FIG. 4 is a sectional view taken from the bottom of FIG. 2.
Figure 6:
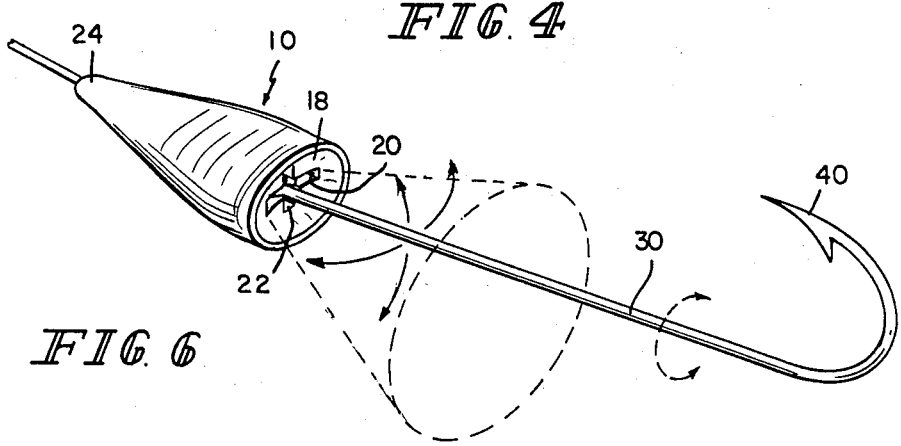
FIG. 6 is a perspective view of the line, hook and sinker showing the freedom of motion available to the hook when the eye of the hook is inserted in the slot in the base of the sinker.

By inserting the eye 32 of a fishhook 30 into the first slot 20 as shown in FIG. 2, the main barb 40 extends generally perpendicularly away from the front and back portions 14. Therefore, when the fish strikes the sinker body, the body will rotate as in FIG. 5, and the main barb 40 will be directed toward either upper or lower portions of the fish's mouth. FIG. 4 illustrates how the hook barb 40 extends away from the shaft of the fishhook 30 to lie in a generally perpendicular orientation with respect to the front and back portions 14 of the sinker.

FIG. 2 illustrates how the fishing line 34 runs through a line hole 36 which extends longitudinally through the center of the sinker. The first slot 20 includes an angular recess 38 which abuts with the hook eye 32. To achieve the configuration illustrated in FIG. 2 the fishing line 34 is first inserted through the line hole 36 and then tied to the eye 32 of the hook 30. The hook 30 is then inserted into the first slot 20. The first slot 20 surrounds the hook eye 32 and prevents rotation of the hook 30. The second slot 22 provides clearance for the knot 42, as illustrated by FIG. 4.

Figure 3:
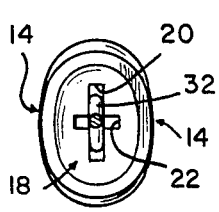
FIG. 3 is a sectional view taken along line 3—3 of FIG. 2.

FIG. 3 shows the relation of first slot 20 with the hook eye 32 when the eye is inserted into the slot. The width of the slot is only slightly larger than the thickness of the hook eye to prevent rotation of the hook. Even when inserted into the slot, considerable freedom of movement is still available to the hook. The hook can move upward and downward or side to side, but the main barb 40 is prevented from rotating with respect to the sinker body 12.

In some commercially available fishhooks, the eye 32 is rotated 90° with respect to the main barb 40. Therefore, in order to obtain the desired configuration, the eye 32 would have to be inserted into the second slot 22. The second slot 22 shaped identically to the first slot 20 and receives the eye of the fishhook in the same manner as the first slot. The first slot 20 would then provide clearance for the knot in this arrangement. Other than this change, the device would function in the same manner as described above.

FIG. 4 is a sectional view taken from the bottom of FIG. 2 which illustrates the substantial difference in width between the front and back portions and the side portions of the sinker. After the hook eye 32 has been inserted into the slot, a wedge 44 is inserted into the line hole, thereby securing the sinker to the fishing line 34. Alternatively, an external force can be applied near the nose end of the sinker body 12 in the direction of the small arrows in FIG. 4. This force will cause the line hole 36 to deform and engage the fishing line 34 thereby securing the sinker to the line.

Although the invention has been described in detail with reference to a certain preferred embodiment, variations and modifications exist within the scope and spirit of the invention as described and defined in the following claims.

What is claimed is:

1. A fishing aid for use with a fishing line, the aid comprising
   a body having an oval cross section along a longitudinal axis, the oval cross section of the body having a width greater than its height, the body configured so that the wide portions on opposite sides of the body rotate to contact the upper and lower portions of the fish's mouth to align the aid in a predetermined orientation inside the fish's mouth when the fish bites the aid,
   a fishhook, the fishhook being non-rotatably coupled to the body so that the main barb of the hook extends in a generally perpendicular direction away from the wide portions of the body, thereby orienting the main barb upward or downward in the fish's mouth, and
   attachment means for securing the aid to the fishing line.

2. The aid of claim 1, wherein the body has a specific gravity greater than one.

3. The aid of claim 1, wherein a body is generally conical in shape, the body further including a tapered nose portion and a base portion.

4. A fishing sinker for use with a fishing line and a fishhook, the sinker comprising
   a generally conical body having front and back portions wider than its side portions,
   locking means for positioning the fish hook so that a main barb of the fish hook extends generally perpendicularly away from the front and back portions of the body
   alignment means for rotating the body relative to the fish's mouth to cause the body to rotate when the fish bites so that the front and back portions of the sinker are situated between the upper and lower portions of the fish's mouth, thereby directing the main barb toward the upper or lower portions of the fish's mouth when the fish bites the hook and sinker, and
   fixture means for securing the body to the fishing line.

5. The fishing sinker of claim 4, wherein the alignment means surrounds the locking means, the locking means being formed to include a slot for receiving the eye of a fishhook to prevent rotation the fishhook relative to the sinker.

6. The fishing sinker of claim 5, wherein the fixture means includes deformable means at the tip of the cone for securing the sinker to a fishing line passing through said hole.

7. A fishing sinker comprising
   a body in the form of a generally elliptical cone having a width greater than its height wherein the body is mirror symmetric about two orthogonal planes passing through a longitudinal axis thereof for receiving a fishing line, and
   a base generally perpendicular to the axis formed to include a slot for receiving an eye of a hook in a non-rotational engagement so that a main barb of the non-rotatably attached hook is directed toward the lesser height portion of the body.

8. The fishing sinker of claim 7, wherein the base is generally concave and includes a second slot generally perpendicular to the first slot for receiving a knot of a line secured to the hook eye.

9. The fishing sinker of claim 8, wherein the slots are both of equal dimensions, thereby allowing the eye of the hook to be inserted in either slot for preferentially orienting a main barb of the hook.

10. The fishing sinker of claim 7, wherein the body has decreasing eccentricity along the longitudinal axis extending away from the base.

11. The fishing sinker of claim 7, including deformable means at the tip of the cone for securing the sinker to a fishing line passing through said hole.

12. A fishing sinker for use with a fishing line and fishhook having a main barb, the sinker comprising
   a substantially conical body having an oval cross section, the body being configured to provide rotational movement of the sinker, upon the application of a biting force by a fish, to align the sinker so that the widest portions of the oval cross section are substantially parallel to the upper and lower portions of the fish's mouth,
   a tapered nose portion for facilitating movement of the sinker through obstructions in the water,
   a generally concave base portion,
   a line hole extending longitudinally through the body from the nose portion to the base portion for receiving the fishing line,
   alignment means for securing the fishhook in a substantially perpendicular arrangement with respect to the widest portions of the oval cross section of the body, thereby directing the main barb of the fishhook toward either the upper or lower portion of the fish's mouth when the fish bites the sinker, and fixture means for securing the sinker to the fishing line.

13. The sinker of claim 12, wherein the alignment means comprises two substantially perpendicular recesses, the first recess adapted to receive an eye of the fishhook to non-rotatably secure the fishhook to the sinker, and the second recess configured to provide clearance for a knot which secures the fishing line to the eye of the fishhook.

14. The sinker of claim 13, wherein both recesses are of equal dimensions thereby allowing the eye of the fishhook to be non-rotatably secured by either recess depending upon the orientation of the eye with the main barb of the hook, the recesses being configured to permit movement of the fishhook upward and downward or side to side but to prevent the main barb from axially rotating with respect to the sinker.

15. The sinker of claim 12, wherein the fixture means includes a wedge member situated in the line hole for engaging both the fishing line and the surface of the line hole to prevent movement of the sinker relative to the fishing line.

16. The sinker of claim 12, wherein the fixture includes a collapsible portion located near the nose portion for engaging the fishing line upon the application of a force to the collapsible position.

17. The combination of a fishing sinker and a fishhook, the sinker comprising
a body having an oval cross section formed to include a line hole along an axis of the body to receive a fishing line coupled to the fishhook, the body being mirror symmetric about two orthogonal planes through the axis to orient the body in a predetermined position inside the fish's mouth when the fish strikes the body, and
means for securing the fishhook in a predetermined orientation with respect to the body so that when a fish strikes the body a main barb of the hook is directed toward either the upper or lower portion of the fish's mouth.

18. The combination of claim 17, wherein the oval cross section of the body has a width substantially greater than its height so that the wide portions on opposite sides of the body rotate to contact the upper and lower portions of the fish's mouth when the fish bites the body, the fishhook being coupled to the body so that the main barb of the hook extends in a generally perpendicular direction away from the wide portions of the body, thereby orienting the main barb upward or downward in the fish's mouth.

19. The combination of claim 17, wherein the securing means includes an angular recess formed in close proximity to the line hole so that an eye of the fishhook abuts the angular recess to insure that the fishhook is secured to the body regardless of the size of the eye.

20. The combination of claim 17, wherein the body has a specific gravity greater than one.

21. The combination of claim 17, wherein the body includes deformable means at an end of the body for securing the sinker to the fishing line passing through the line hole.

* * * * *

UNITED STATES PATENT AND TRADEMARK OFFICE
CERTIFICATE OF CORRECTION

PATENT NO. : 4,803,798

DATED : February 14, 1989

INVENTOR(S) : Dan L. Hannah

It is certified that error appears in the above-identified patent and that said Letters Patent is hereby corrected as shown below:

At column 4, line 17, please delete "5" and insert therefor --4--; and

At column 4, line 25, after the word "thereof", please insert --, and a hole aligned with the longitudinal axis thereof--.

Signed and Sealed this

Fourth Day of July, 1989

Attest:

DONALD J. QUIGG

Attesting Officer

Commissioner of Patents and Trademarks